United States Patent
Song et al.

(10) Patent No.: US 10,244,736 B2
(45) Date of Patent: Apr. 2, 2019

(54) SYSTEM AND METHOD FOR AUTOMATICALLY DETERMINING ANIMAL POSITION AND ANIMAL ACTIVITY

(71) Applicant: Lely Patent N.V., Maassluis (NL)

(72) Inventors: Xiangyu Song, Rotterdam (NL); Pieter Neelus Kool, Hardinxville-Giessendam (NL); Adolf Jan Van Der Kamp, Kampereiland (NL); Patrick Philip Jacob Van Der Tol, Amersfoort (NL)

(73) Assignee: Lely Patent N.V., Maassluis (NL)

( * ) Notice: Subject to any disclaimer, the term of this patent is extended or adjusted under 35 U.S.C. 154(b) by 1024 days.

(21) Appl. No.: 13/913,707

(22) Filed: Jun. 10, 2013

(65) Prior Publication Data
US 2013/0269618 A1    Oct. 17, 2013

Related U.S. Application Data

(63) Continuation of application No. PCT/NL2011/000071, filed on Nov. 3, 2011.

(30) Foreign Application Priority Data

Dec. 10, 2010    (NL) ..................................... 1038445

(51) Int. Cl.
A01K 29/00    (2006.01)
A01K 1/00    (2006.01)
A61D 17/00    (2006.01)

(52) U.S. Cl.
CPC .............. A01K 29/005 (2013.01); A01K 1/00 (2013.01); A61D 17/002 (2013.01)

(58) Field of Classification Search
CPC .......... A01K 29/005; A01K 1/00; A01K 1/12; A01K 11/006; A61D 17/002

USPC .......... 119/14.08, 51.02, 840, 161, 516, 416, 119/625
See application file for complete search history.

(56) References Cited

U.S. PATENT DOCUMENTS

2011/0298619 A1*  12/2011  O'Hare et al. ............. 340/573.1

FOREIGN PATENT DOCUMENTS

| EP | 624313 | 11/1994 |
|---|---|---|
| EP | 1212939 | 6/2002 |
| FR | 2759541 | 8/1998 |
| GB | 2076259 | 11/1981 |
| WO | WO 2010066429 A1 * 6/2010 | ............. A01K 29/00 |

OTHER PUBLICATIONS

International Search Report of PCT/NL2011/000071 dated Jan. 17, 2012.

* cited by examiner

*Primary Examiner* — Joshua D Huson
(74) *Attorney, Agent, or Firm* — Hoyng Rokh Monegier LLP; Ramin Amirsehhi

(57) ABSTRACT

Monitoring activity of an animal in a system for housing freely moving animals including a plurality of animal ID stations, includes the steps of a) recording a first visit of said animal at a first of said animal ID stations, b) recording a subsequent second visit of said animal at a second of said animal ID stations, and c) determining a distance covered by said animal as the distance between said first animal ID station at said first visit and said second animal ID station at said second visit. With such simple means, parts of which are already present in e.g. most robot dairy stables, important information about activity of animals can easily be gathered.

23 Claims, 2 Drawing Sheets

SYSTEM AND METHOD FOR AUTOMATICALLY DETERMINING ANIMAL POSITION AND ANIMAL ACTIVITY

CROSS REFERENCE TO RELATED APPLICATIONS

This application is a continuation of PCT application serial number PCT/NL2011/000071 filed on 3 Nov. 2011, which claims priority from Netherlands application number 1038445, filed on 10 Dec. 2010. Both applications are hereby incorporated by reference in their entireties.

BACKGROUND OF THE INVENTION

1. Field of the Invention

This invention relates to a system and method for monitoring activity of an animal. In particular, the invention relates to a method for monitoring activity of an animal in a system for housing freely moving (free walking) animals comprising a plurality of animal ID stations, the method comprising the steps of a) recording a first visit of said animal at a first of said animal ID stations, and b) recording a subsequent second visit of said animal at a second of said animal ID stations.

2. Description of the Related Art

Known methods of monitoring activity of freely moving animals generally include an animal identification means. However, it is most often used in the milking context to simply record the times of milking, without drawing any conclusion about the activity of the animal. Still, in e.g. dairy and pig farming it is desired to be able to automatically monitor the activity of animals in order to determine if an animal behaves outside of the generally normal behaviour. Such atypical behaviour can be a sign that the animal is in heat, or that it is ill or the like.

For example, in GB 2,076,259, in order to detect heat in cows it is described to equip the cows with a so-called activity meter attached to one of the cow's legs. A cow in heat will be more active and walk more. The activity meter can register this. In order to automatically alert the farmer the activity meter can upload the information continuously or batch wise to a computer. This type of system is prone to give false positive readings because the movements of the legs do not always indicate that a cow is actually walking In FR2759541 an animal activity monitoring system is described in which cows are continuously monitored with the aid of a surveillance camera and a visual identification marker on the animal. The positions of the cows are recorded and stored in a memory. These data are used to calculate the amount (d) a cow has displaced itself over a period of time. The amounts (d) are continuously determined for all cows of the herd and are sent to an alerting means to inform the farmer which cows of his herd are in heat. A drawback of this system is that is depends on an extensive video surveillance system that is expensive. Moreover, in most dairy stall layouts, there are too many parts for such a system to cover, such as milking stalls, feeding stations and so on. Furthermore, it is not clear what happens when vision is blocked by e.g. a cow standing in front of a lying cow or disappears around a corner.

In EP0624313 an animal activity monitoring system is described that will equip the animal with an identification means, such as tag, that communicates with an antenna or transceiver. The antennae transceiver devices are distributed in a stable, for example at a milk stand, a feeding station or the like. The transceiver device can recognize the signal received from a tag of a cow and register when, how long and where a cow is. On the basis of these data visiting frequency distribution, displacement patterns etc can be determined and if so desired reproduced. In particular in EP0624313 it is proposed to calculate the number of visits per day of an animal to a specific station, or a frequency distribution of the number of visits over a number of days, and the like. Still it appears that this system is not always best suited to provide the most reliable information about activity of the animal.

BRIEF SUMMARY OF THE INVENTION

The present invention addresses these problems by providing a method for monitoring activity of an animal in a system for housing free walking animals comprising a plurality of animal ID stations, the method includes recording a first visit of said animal at a first of said animal ID stations, and recording a subsequent second visit of said animal at a second of said animal ID stations.

This object is achieved by a method that is characterized by determining a first distance between said first animal ID station at said first visit and said second animal ID station at said second visit, and determining a distance covered by said animal on the basis of said first distance. This rather simple method uses the insight that to go from one animal ID station to another, the animal has to cover at least the distance in between, i.e along the shortest possible route. A big advantage of the method is that most layouts of animal housings already have a useful number of animal ID stations, such that determining the distance covered comes down to determining the shortest route in that layout between possible positions of the ID stations. Furthermore, separate activity meters such as those strapped to a cow's leg may be dispensed with.

In the above, "on the basis of" means that first the distance between said first animal ID station at said first visit and said second animal ID station at said second visit, and next, in order to determine the distance covered by said animal, a mathematical function is applied to said distance. An example of such a function is a correction factor, to account for variations in the path actually followed by the animals, which may of course vary per animal and per visit. The correction factor could lie between for example 1 and 2. Precise values can easily be found on the basis of the tracking of a number of animals and comparing the actual distance covered with the theoretical summed distance between the various ID stations. In a simple approximation, no correction factor is used, or one could say a correction factor of exactly one, and the strict value of the first distance is taken as the distance covered, of course as an approximation. However, in practice animals will often follow a path that is pretty much the shortest possible route.

In the present invention, recording comprises detecting the presence of the animal and establishing the identity thereof, and storing same in a register of e.g. a computer. Also, an identity of the animal ID station will be determined. If the animal ID station is a stationary station, the identity will suffice to determine a position, as this need only be determined once in the layout of the housing system. The distance covered can then easily be calculated, as will be elucidated below. If the animal ID station is a movable station, also a position of the station will be determined, at the time of detecting the animal. The position, or an indication for determining same, is stored with the animal data.

Although the animal ID stations are not particularly limited, advantageously at least one, and preferably each, of said animal ID stations comprises an animal treatment station, such as a robot milking station, a feeding station, a selection gate, a cubicle, a manure slide or a cow brush. Herein, an animal treatment station is understood as a station with a device that is arranged to perform an action or treatment on the animal other than simply identifying, such as milking, feeding, watering, brushing, cleaning, examining, selecting separating or the like. The animal ID station may also comprise a gate between sections in e.g. a stall or the like. The station may be stationary or movable, such as a movable feeding station, e.g. a feed cart. Moving the station around provides the possibility to position the animal ID station in a useful, desirable, such as busy, position. The animal ID station may also be an autonomously movable station, i.e. with drive means and a drive controller. In particular, the autonomous vehicle(s) may be e.g. a manure sliding vehicle, such as the LELY DISCOVERY™, a feed pushing vehicle such as the LELY JUNO™, a feeding cart or a milking robot cart. The advantage of all the above embodiments is that these devices are mostly already provided with such animal detection functionality anyway. Therefore, the hardware need hardly, if at all, be adapted and it is easy and cheap to provide an extra functionality according to the present invention. Still, it is also possible to use an animal ID station that has as its sole functionality the detection and identification of animals, such as dedicated detection gates, separate antennas, mounted stationary or on a(n autonomously) movable vehicle, and so on. Note that the advantage of using already present devices is not achieved with these dedicated ID stations.

The animal ID station may also comprise a plurality of animal stations, such as a row of cubicles or a feeding fence with feeding positions, and with at least one animal ID detection device that is movable along the plurality of animal stations. In this way, a single ID device can cover a large number of animal stations. Preferably, the plurality of animal stations comprises animal locking means for locking an animal in the station(s), at least during identification by the animal ID detection device. In this way, the single device can still reliably determine the animals' ID. Such locking means may comprise e.g. lockable gates. In particular, the animal ID detection device is mounted movably on a rail or guide, or in a tube. The latter protects it optimally against dirt.

Preferably, the step of determining the distance covered comprises determining a shortest possible route available to said animal between said first animal ID station at said first visit and said second animal ID station at said second visit and determining the length of said route. Although the simplest way to determine the distance covered is to calculate the distance between the relevant animal ID stations along a straight line. However, in many cases it is impossible for the animal to walk this straight line. Instead, she has to follow a more or less curved route that takes it from one station to the other. In reality, many routes will be possible, but it is not possible with the simplest set-up according to the present invention to determine the exact path or route between two consecutive stations. Therefore, the shortest possible route is taken as the (minimum) distance covered. In practice, it turns out that most animals are rather goal-oriented, and often actually take essentially the shortest available route.

In one embodiment, the first and the second animal ID stations are different stations. In particular when these are stationary stations, calculating the route is easy, for this need only be done once, such as before installing the system. Drawing a layout of the housing system, sketching the possible routes between the two stations, calculating the respective distance, and selecting the shortest distance suffices.

In another embodiment, at least one of said animal ID stations is an autonomously movable station, and the method further comprises determining a position in the housing system of the at least one animal ID station, i.e., the at least one autonomously movable station, at the time of the visit of the animal to the at least one animal ID station. In modern animal husbandry, displaceable devices are known to be used. For example feed distribution systems that are guided by a rail and distribute fodder to animals are known. Also autonomously movable vehicles are known to be used for example for manure removal or for shoving feed to the feed fence. By turning such vehicles into animal ID stations, the system may need fewer separate stations because such vehicles "see" an animal more often than e.g. a stationary feed station, a selection gate, or in case the animal is a dairy animal, a stationary milk robot. Thus, with one or more of such animal ID stations, the system will require fewer stations for an equal amount of data. With such autonomously movable stations, one is able to more accurately determine the distance an animal has covered. Since the position of a movable station is not known beforehand, and may change in time, it is necessary to determine the position of the station at the time of the visit. From that moment on, the same procedure as outlined above for stationary stations may be used to calculate the (minimum) distance covered. A movable station and a stationary station will not be in the exact same position.

Note that if both stations involved are movable stations, it is possible that during the time between detection of an animal by the first station and detection by the second station, the animal has not moved. But then the respective positions of the stations are the same, and the distance covered will simply be zero.

Note also the case when the first and the second animal ID station are the same animal ID station. Now, the position at the first visit and the position at the second visit are used, again with the same procedure to determine distance covered as outlined above. If the station is a stationary station, the animal will have returned there. Although some distance must have been covered, it is impossible to tell how much. If the station is a movable station, the minimum distance covered is that between the two positions of the movable station.

Advantageously, the method also comprises recording each subsequent next visit of the animal at a subsequent next of the animal ID stations, and adding to the distance covered by the animal the distance between the subsequent next animal ID station at the subsequent next visit and the animal ID station last visited by the animal before said subsequent next visit, at said last visit before said subsequent next visit. With this method, the total distance covered between a plurality of visits can be calculated, by tracking the animal. Again, the animal stations may be same, either pairwise or even all of the stations, if it is a movable station. It is possible to compare the distance covered between animals. Thus, it is not necessary to record the time of the visits, as long as the total duration for comparing is the same. Such comparing of distance covered may already be an indication of increased activity.

Preferably, the method comprises performing the steps during a predetermined period of time. This not only makes a comparison easier when the periods of time are not the same, but also a comparison with historical values for that same animal. This is a powerful tool to detect changes in behaviour, for example heat or lameness.

Advantageously, the method comprises calculating an average speed for the distance covered. Also advantageously, recording comprises recording the time of each visit, and the method further comprises calculating an average speed between two subsequent visits of said animal. This may be done e.g. for the period of time between two visits, in which case the average speed for the displacement from one station to another is calculated. This may already provide useful information, as a particularly high or low value may indicate e.g. panic or a high activity, or e.g. tardiness or hoof problems, respectively. Again, a comparison with historical values or averages, e.g. per animal or per animal group, may provide additional information. Preferably, the average speed is calculated for said predetermined period of time. In this case, it is not necessary to record the time of visiting for each visit, as the time to be used is fixed. The predetermined period of time is e.g. one hour, or a day. This makes comparison very easy and meaningful. Note that too short a period of time as the basis for the calculation bears the risk of a too large influence of the last leg of the route that has not yet been ended by visiting a station. For example, if the period is one hour and the animal visits a station at t=0 and at t=20 minutes, the distance covered during the last 40 minutes must necessarily be taken to be zero for no subsequent station was visited. If the period of time is long enough, or at least if the stations are so numerous and so well-distributed that the time between visits is, on average, small compared to the period of time, said influence will also be small. In view of the above, it appears advantageous if the method comprises generating an attention signal, or alarm, for the animal if at least one of the distance covered or the average speed is greater than a respective high threshold value or lower than a respective low threshold value.

The invention also relates to an animal activity monitoring system for monitoring animal activity in a housing system for housing freely moving animals, comprising a plurality of animal ID stations arranged in said housing system, and a control device, wherein the monitoring system, in particular the control device, is arranged to perform a method according to the invention. The advantages as described for the method also hold for the system, and will therefore not be repeated here. The other way around, any advantages mentioned below for particular systems, will have their counterpart in a corresponding method, with much the same advantages. It is noted in particular, however, that the present system is very convenient for addition to an existing animal housing system, as the latter will very often have many animal ID stations.

In one embodiment, at least one, and preferably each, of the animal ID stations comprises a tag reader. This could relate to RFID systems, or other tag or responder systems. Of course, then the animals are to be provided with readable tags, and if necessary, also one or more antennae or transmitters should be provided. These details are however commonly known in the art.

In another embodiment, the system further comprises a mapping means (mapping device) arranged to determine a shortest possible route available to an animal in said housing system between animal ID stations consecutively visited by said animal. As mentioned, such mapping means may be based on (car) navigation systems. To use these, it may be advantageous to determine waypoints of possible routes in the housing system, such as corners, gates and the like. Also, even in a free housing system, an animal may not walk everywhere. Some obstacles may be due to the layout. For example a cow will not be allowed to walk through the feed alley of a stable. Other obstacles may incidentally occur, for example a cow may be barred to enter a certain portion of the stable, such as e.g. a separation area, unless it is specifically allowed to enter. All this information may be entered into the mapping means, and can be used to determine possible routes, and then the shortest possible route and the corresponding distance covered. Therefore, preferably, the mapping means comprise a layout of the housing system.

The system advantageously comprises a clock, wherein the control device is arranged to record with each visit of an animal the time of said visit. The control device, which is most often a computer or at least dedicated electronic circuitry, will almost always comprise a clock. It is advantageous to use this for recording the time of visit, or to determine the time period in which to calculate the total distance covered.

In yet another embodiment, the control device is arranged to calculate an average speed by performing the method steps during a predetermined period of time and/or calculating an average speed for the distance covered. Then, advantageously, the system also comprises attention signal means, in particular arranged to give an attention signal. As mentioned above, deviating (total) distance covered or deviating average speed may indicate problems which require attention.

The invention also relates to a housing system for housing freely moving animals, comprising a system according to the invention. A particularly advantageous example of such a housing system relates to a dairy housing system for free-walking cows, or goats et cetera, especially if it comprises one or more milking robots. Such housing systems already have a plurality of animal ID stations, such as one for each milking robot and for each concentrate feeding station, although these are sometimes combined. They often have further ID stations at gates, such as between a feeding and a resting area or a selecting gate for a resting area in front of the milking parlour. Such animal ID stations already provide useful information if arranged and used according to the present invention. It is furthermore easy and cheap to include further ID stations, to be able to track the animal more precisely.

BRIEF DESCRIPTION OF THE DRAWINGS

The features and advantages of the invention will be appreciated upon reference to the following drawings, in which.

DESCRIPTION OF ILLUSTRATIVE EMBODIMENTS

Figure 1:
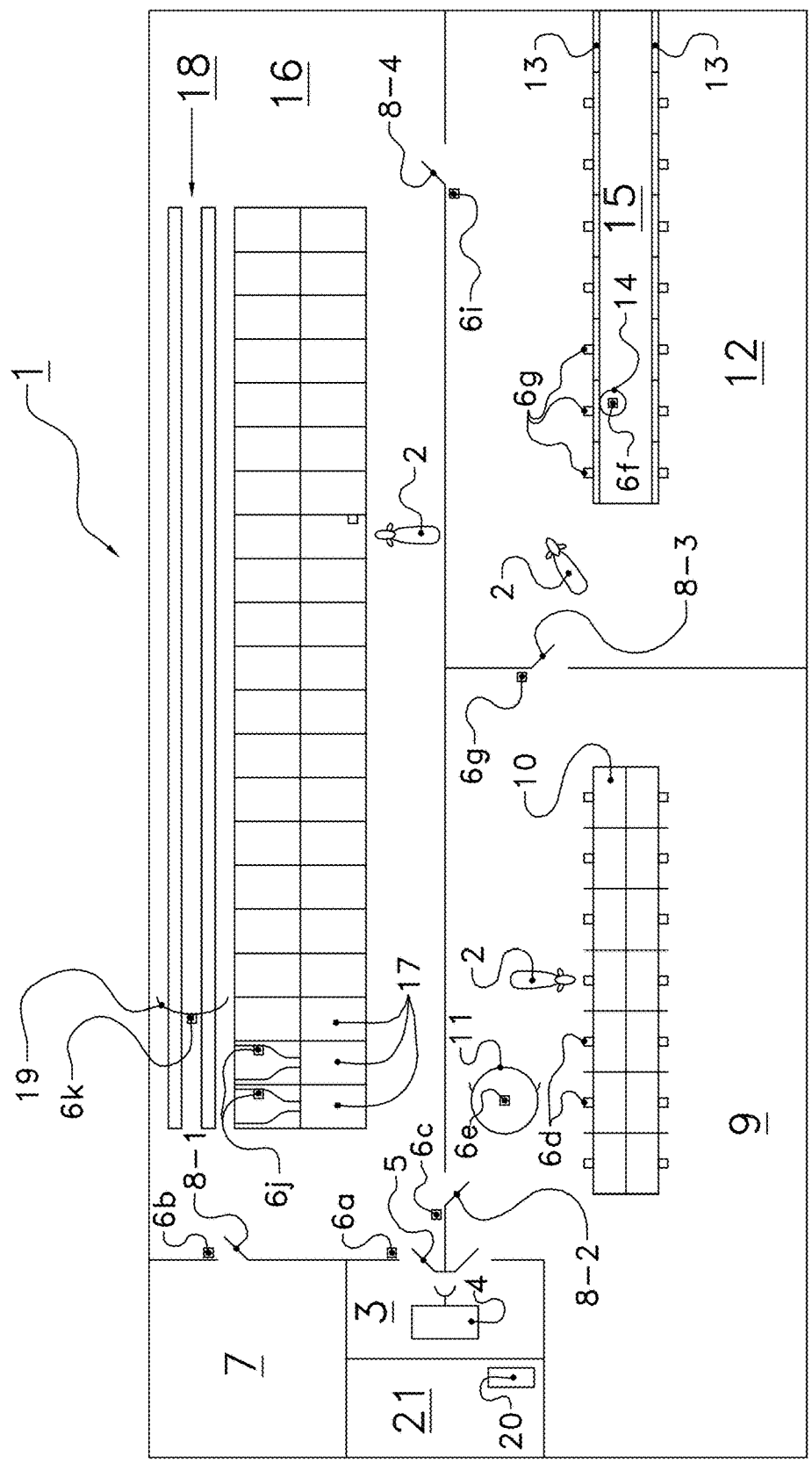
FIG. 1 is a diagrammatic layout of an animal stable with the system of the invention installed.

The following is a description of certain embodiments of the invention, given by way of example only and with reference to the drawings. FIG. 1 is a not-to-scale diagrammatic layout of an animal stable 1 for animals 2, with the system of the invention installed. The stable 1 comprises a milking parlour 3 with a milking robot 4, accessible via parlour gate 5 with an animal ID-station (AIS) 6a. A separation area is indicated with 7, with a gate 8-1 and an AIS 6-b.

A gate 8-2 with AIS 6c is provided for going directly to a concentrate feeding area 9 with individual concentrate feeding stations 10, each with an AIS 6d, and with a manure pusher vehicle 11 with an AIS 6e. A gate 8-3 with an AIS 6h provides access to a silage feeding area 12 with a feed fence 13. A feed pusher vehicle 14 with AIS 6f moves about in a feed alley 15.

A gate 8-4 with an AIS 6i provides access to a resting area 16 with a number of cubicles 17 each with an AIS 6j. Along a track 18, a manure slide 19 with an AIS 6k is movable.

A control unit 20 is provided in a control room 21.

The layout of the stable 1 may not be ideal in terms of animal housing. However, it is only shown as an example with many AIS, to make the invention clearer. Any other, such as a smaller, number of AIS is clearly possible. For example, not every separate position at the feed fence need be provided with its own AIS, for one single AIS for the whole fence is also possible, albeit at the cost of precision. Moreover, it is possible have AIS-free movable devices. This simplifies the design, as then all devices are movable, with positions known beforehand.

Furthermore, although the pluralities of AIS 6d, and 6g and 6j, respectively, have been indicated with in each case only one reference numeral, it will be clear that each individual AIS has a separate station identity. It is only for clarity that these have not separately been indicated in the figures nor in the reference numerals.

The AIS 6 used here are RFID tag readers, that detect the animal's responder or "tag". Other AIS device are possible, such as optical cow recognition, e.g. based on skin pattern or optical markings.

The activity monitoring system works as follows. Each time an animal 2 presents itself at a device with an AIS 6, the animal's identity is established and a set of data comprising at least the animal's identity and an identification of the station are stored in a register in the control device 20, most often a computer with a database. Preferably, also the time of the presenting is stored. The very next time the same animal presents itself at any of the devices with an AIS 6, the animal is again identified and a new record with animal identity and station identity is stored. If the station identity is the same and it is a stationary station, then the subsequent identification only means that the animal has returned to the same station. Then, no conclusion can be drawn as tot he route followed by the animal, or, in other words, a minimum distance of 0 meters is added to the distance covered by the animal. However, if the stations' identities differ, or, when the stations' identities are the same but the station has moved between the visits, some distance must have been covered by the animal. A minimum distance can be determined by simply looking at the shortest route between the positions of the visits. All this will be elucidated on the basis of an example given in FIG. 2. In case of a moving device, preferably autonomous, such as feed pusher 14, e.g. the LELY JUNO™, a manure slide 19 or a manure pusher 11, e.g. the LELY DISCOVERY™, the monitoring system comprises position determining means to determine the position of said device. Such position determining means may comprise any such means known per se, such as a gps-based system or a camera with image processing. In the case of a device moved along a track, such as the manure slide 19, it is also possible to count the steps in a stepper motor or a similar method. At the time of recording a visit, or to be precise when the presence of the animal is detected, the position of the movable station is determined and stored together with the visit.

Figure 2:
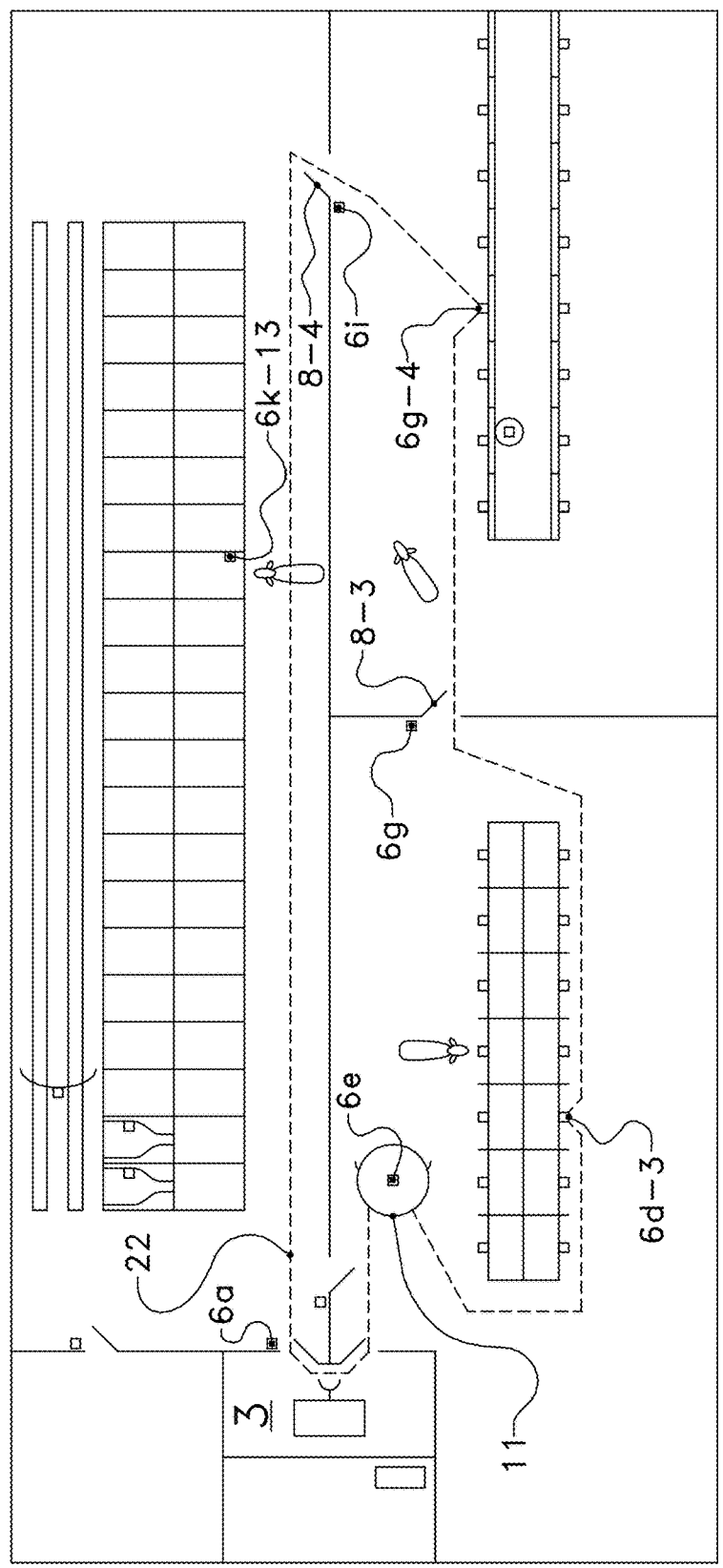
FIG. 2 is the layout of FIG. 1 in which the route a particular animal has covered is indicated.

A concrete example will now be shown in FIG. 2. This shows the layout of FIG. 1 in which the route 22 a particular animal has covered has been indicated as a dashed line.

The particular route 22 shown here runs as follows. The animal is first identified at AIS 6a when she is milked in the parlour 3. After that, she is identified by AIS 6e of the manure sliding vehicle 11, followed by an identification at AIS 6d-3, where she eats concentrate. Subsequently, she is identified by AIS 6h at gate 8-3, after which she moves to the feeding gate where she is identified by AIS 6g-4. Here the cow eats silage. Next, the cow is identified by AIS 6i at gate 8-4, to go to a cubicle for resting, where she is identified by AIS 6k-13. After lying for a while, she moves again to the milking parlour 3 and is identified again by AIS 6a.

At each visit, the identity of the animal, in the present example a cow, but it could also be a goat, a pig and so on, is determined by the respective AIS, and stored in the computer 20, together with the AIS identity. Preferably, but not necessarily, the time of each visit is also stored, together with the other data of the visit. Note that the order of the visits and the position of the corresponding AIS is what matters primarily for distance.

The computer can now determine the distance covered by starting at the first two records, i.e. the first two AIS where an identification of the cow takes place. In the present case, they are 6a and 6e. At the time of the second visit, i.e. of the vehicle 11, its position is determined, e.g. by means of a local gps system in the housing system or a built-in tracking system that records the path traveled by the vehicle 11. The cow will then have covered a distance of at least the part of route 22 between AIS 6a and AIS 6e. Although the cow may have walked along a different, and longer path, it appears that they hardly "go the extra mile" and walk rather efficiently to a destination. In any case, the minimum distance as determined according to the invention is still a useful quantity.

The next recorded visit is at AIS 6d-3. The additional, minimum distance is the part of the route 22 between AIS 6e and 6d-3. Although it is possible that the cow walks around the set of feeding stations to the right, i.e. along the longer route, again the consideration is that at least a minimum distance is covered. Hence, the route is taken along the left side of the feeding stations.

The rest of the route is built up on the same basis. It is noted that it is relatively simple to calculate the (minimum) path lengths involved in the present method. Thus, it is only necessary to define a number of waypoints, such as the positions of the AIS themselves and of corners in possible routes, such as around the set of feedings stations, towards gates and so on. Simple geometry will them provide the distances involved. Reference is made to the distance calculating means in a route planning system of a navigation system. A mapping means for that end may also be provided in the computer 20. A map of the housing system 1 may be entered in the computer, with the relevant positions of the stationary AIS and the waypoints such as corners entered for calculation of possible routes.

On the basis of the distance covered as determined according to the above, it is possible to draw a number of conclusions. For example, if said distance between two consecutive visits to the milking parlour 3 is much longer than the theoretical minimum of a single round, then the cow has e.g. a low rank and is thus often bullied away, is very restless or curious or the like. It is then possible to set a threshold to the total distance covered between such visits to the milking parlour, and when said distance is higher than the threshold, to generate an attention for said cow in the computer 20. A similar consideration is possible for total distance covered in 24 hours. A higher than normal distance could indicate in particular heat. Note that for these considerations it is not necessary to record the time of the visits. A lower than normal distance could indicate illness, claw problems and so on.

Another useful information is the average (minimum) speed of the cow. For this it is necessary to record the time of the visits, and to divide the distance calculated by the time between the relevant visits. This could be done on the basis of consecutive visits, resulting in an average speed between consecutive visits, or for longer periods of time, such as for an hour, or for a whole day. Again, a determined average speed above a high threshold could indicate heat or a low social rank, while a speed lower than a low threshold could indicate illness or the like, or even a malfunctioning gate or the like, in particular if this holds for all cows.

Herein, the high and low thresholds may be based on general data for the type of animal, such as literature values, or historical values. Preferably, they are individualised values for each animal, and they may be based on a running average.

One could argue that in the example shown, the total minimum distance covered between two milking round is simply the distance of one round. That may be about true, apart from the detour around the vehicle 11, but then again this was route-wise a somewhat simplified example. In practice, it may happen that a cow is bullied away from a feeding station 10 and goose to another one, where she is again identified. This may add to the covered distance. Or she may go another round before being milked, and so on. Another important factor is that the layout shown is predestined to a simple route, as it comprises (one-way) gates. In other layouts, the number of gates may be much lower, thus making many more routes between the stations possible. Furthermore, the magnitude of the speed is independent of the type of the route followed.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A method for automatically monitoring activity of an animal in a system for housing freely moving animals comprising a plurality of animal ID stations, the method comprising the steps of
   a) recording a first visit of the animal at a first of the animal ID stations;
   b) recording a subsequent second visit of the animal at a second of the animal ID stations;
   c) determining a first distance between the first animal ID station at the first visit and the second animal ID station at the second visit, and
   d) determining a distance covered by the animal on the basis of the first distance.

2. The method of claim 1, wherein the distance covered by the animal is determined as the first distance times a correction factor.

3. The method of claim 1, wherein at least one of the animal ID stations comprises an animal treatment station.

4. The method of claim 3, wherein each of the animal ID stations comprise an animal treatment station.

5. The method of claim 3, wherein the animal treatment station is selected from the group consisting of: a robot milking station, a feeding station, a selection gate, a cubicle, a manure slide or a cow brush.

6. The method of claim 1, wherein at least one animal ID station comprises an autonomously movable animal treatment station.

7. The method of claim 6, wherein the autonomously movable animal treatment station comprises a manure sliding vehicle, a feed pushing station, a feeding cart or a milking robot cart.

8. The method of claim 1, wherein the step of determining the distance covered further comprises determining the length of the route.

9. The method of claim 1, wherein the first and the second animal ID stations are different stations.

10. The method of claim 1, wherein at least one of said animal ID stations is an autonomously movable station, the method further comprising determining a position in the housing system of the at least one animal ID station at the time of the visit of the animal to the at least one animal ID station.

11. The method of claim 10, wherein the first and the second animal ID station are the same animal ID station.

12. The method of claim 1, comprising recording each subsequent next visit of the animal at a subsequent next animal ID station, and adding to the distance covered by the animal the distance between the subsequent next animal ID station at the subsequent next visit and the animal ID station last visited by the animal before the subsequent next visit, at the last visit before the subsequent next visit.

13. The method of claim 1, comprising performing the steps during a predetermined period of time.

14. The method of claim 13, comprising calculating an average speed for the distance covered.

15. The method of claim 14, comprising generating an attention signal for said animal if at least one of the distance covered or the average speed is greater than a respective high threshold value or lower than a respective low threshold value.

16. The method of claim 1, wherein recording comprises recording the time of each visit, and calculating an average speed between two subsequent visits of the animal.

17. An animal activity monitoring system for monitoring animal activity in a housing system for housing freely moving animals, comprising the plurality of animal ID stations arranged in said housing system, and a control device, wherein the monitoring system is configured to perform the steps of:
   a) recording a first visit of the animal at a first of the animal ID stations;
   b) recording a subsequent second visit of the animal at a second of the animal ID stations;
   c) determining a first distance between the first animal ID station at the first visit and the second animal ID station at the second visit, and
   d) determining a distance covered by the animal on the basis of the first distance.

18. The system of claim 17, wherein at least one of the animal ID stations comprises a tag reader.

19. The system of claim 17, further comprising a mapping device arranged to determine a shortest possible route available to an animal in the housing system between animal ID stations consecutively visited by said animal.

20. The system of claim 19, wherein the mapping mechanism comprise a layout of the housing system.

21. The system of claim 17, comprising a clock operatively connected to the control device, wherein the control device is arranged to record with each visit of an animal the time of said visit.

22. The system of claim 21, wherein the control device is arranged to calculate an average speed for the distance covered over the recorded time.

23. The system of claim 17, comprising an alarm to generating an attention signal for the animal if at least one of the distance covered or the average speed is greater than a respective high threshold value or lower than a respective low threshold value.

* * * * *